United States Patent
Liu et al.

(10) Patent No.: US 6,624,805 B2
(45) Date of Patent: Sep. 23, 2003

(54) CURSOR CONTROLLER

(75) Inventors: Chin-Sheng Liu, Sanchong (TW); Chin-Wen Su, Chungho (TW)

(73) Assignee: Behavior Tech Computer Corporation, Taipei (TW)

( * ) Notice: Subject to any disclaimer, the term of this patent is extended or adjusted under 35 U.S.C. 154(b) by 242 days.

(21) Appl. No.: 09/899,146

(22) Filed: Jul. 6, 2001

(65) Prior Publication Data

US 2003/0006960 A1 Jan. 9, 2003

(51) Int. Cl.[7] .............................................. G09G 5/08
(52) U.S. Cl. ........................................ 345/160; 345/168
(58) Field of Search ................................. 345/157, 159, 345/160, 163, 168, 169; 341/20, 22

(56) References Cited

U.S. PATENT DOCUMENTS

| | | | | |
|---|---|---|---|---|
| 5,889,507 A | * | 3/1999 | Engle et al. ................. | 345/161 |
| 6,002,388 A | * | 12/1999 | Seffernick et al. .......... | 345/161 |
| 6,107,993 A | * | 8/2000 | DeVolpi ...................... | 345/161 |
| 6,323,840 B1 | * | 11/2001 | Steinbrunner ............... | 345/161 |
| 6,353,431 B1 | * | 3/2002 | Poole et al. ................. | 345/161 |
| 6,549,191 B2 | * | 4/2003 | Leman ........................ | 345/168 |

* cited by examiner

*Primary Examiner*—Regina Liang
(74) *Attorney, Agent, or Firm*—Rosenberg, Klein & Lee

(57) ABSTRACT

A cursor controller is installed on a computer keyboard, for the purpose of controlling the direction and speed of movement of the cursor. The cursor controller is shaped somewhat like a post unit; at its bottom is an arched face. On this arched bottom are several protruded-post contact points, each protruded-post contact point corresponding to respective electrical contact point at matching positions on the surface of the circuit board inside the casing of the keyboard. Each protruded-post contact point is in the arrangement of two concentric circles on the arched bottom of the cursor controller. Four protruded-post contact points form a set, comprising eight cursor movement directions, i.e., up, upper right, right, lower right, down, lower left, left, and upper left. By way of the height difference of each electrical contact point on the arched bottom, the operator can apply pressure in different directions and forces on the cursor controller, conducting to the electrical contact point in different directions and quantities, to change the direction and speed of the moving cursor.

3 Claims, 2 Drawing Sheets

CURSOR CONTROLLER

BACKGROUND OF THE INVENTION

1. Field of the Invention

This invention relates to a cursor controller, comprising a plurality of protruded-post contact points that are symmetrically arranged in two concentric circles on an arched bottom. By way of the height difference of each electrical contact point, the operator can apply different pressures to change the direction and sped of the moving cursor.

2. Background of the Invention

The mouse is an essential appliance in the operation of computer. Its basic construction involves a tracking ball installed in the casing of a mouse, the surface of the tracking ball in contact with a crosswise shaft and a lengthwise rolling shaft to obtain the X-Y coordinates as required. The bottom of the tracking ball is slightly protruded out of the bottom of the casing for contact with an appropriate flat surface. The operator moves the mouse on said flat surface to control the movement of the cursor on the monitor.

In operating the mouse, the surface of the tracking ball must be kept in contact with the matching surface. Therefore, an appropriate space is required for smooth operation to control the direction and speed of the moving cursor. Furthermore, in the process of controlling the cursor movement, the mouse can be moved only in fast speed. As a result, there would often be the problems of insufficient space and unsatisfactory movement of the cursor, particularly when operating game software that requires faster movement of the cursor.

SUMMARY OF THE INVENTION

The primary objective of the invention is to provide a cursor controller, which has a plurality of protruded-post contact points symmetrically arranged in two concentric circles on an arched bottom of the control. By way of the height different of each electrical contact point, the operator can apply different pressures to change the direction and the speed of the moving cursor.

According to the invention, the cursor controller is installed at a fixed position on a computer keyboard. The cursor controller is shaped somewhat like a post, having an arched bottom. On the arched bottom, there are a plurality of protruded-post contact points. Each protruded-post contact point corresponds to each of electrical contact points that are arranged in two concentric circles on the arched bottom, four protruded-post contact points forming a set, which comprises eight cursor movement directions, i.e., up, upper right, right, lower right, down, lower left, left, and upper left. By way of the height difference of each electrical contact point on the arched bottom, the operator can apply pressures on the control, in different directions and forces, conducting to electrical contact points in different directions and different quantities, to change the direction and speed of the moving cursor.

Another objective of this invention is to provide a cursor controller, installed at a fixed position without occupying much space. An operator can conveniently control the cursor controller with his fingers significantly and simplify.

Yet another objective of this invention is to provide a cursor controller with simplified construction, which measurements can be changed to suit the location of installation, so that the cursor controller can be installed on other different peripherals, such as a mouse or a notebook computer.

BRIEF DESCRIPTION OF THE DRAWINGS

The drawings of preferred embodiments of this invention are described in following details to enable better understanding.

DETAILED DESCRIPTION OF PREFERRED EMBODIMENTS

Figure 1:
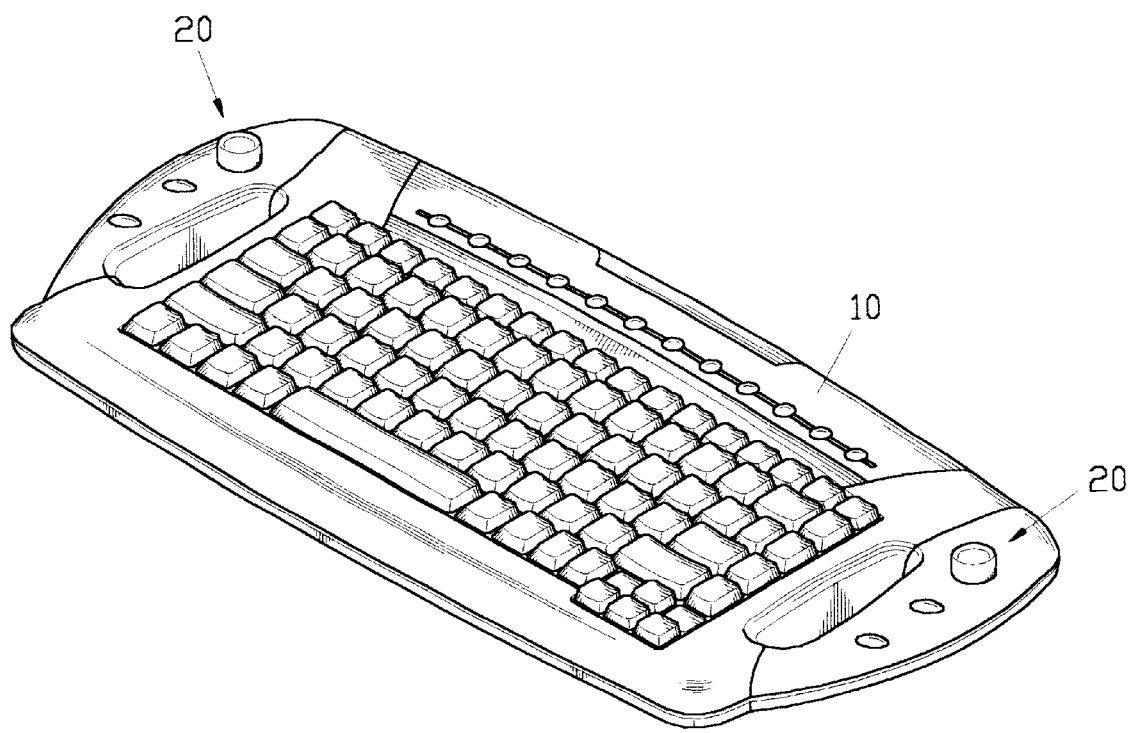
FIG. 1 is a perspective view of a preferred embodiment of the invention when installed on a keyboard.

As shown in FIG. 1, of cursor controller 20 of the invention is installed at an appropriate position on a computer keyboard 10, for controlling the movement, direction and speed variation of the mouse cursor.

Figure 2:
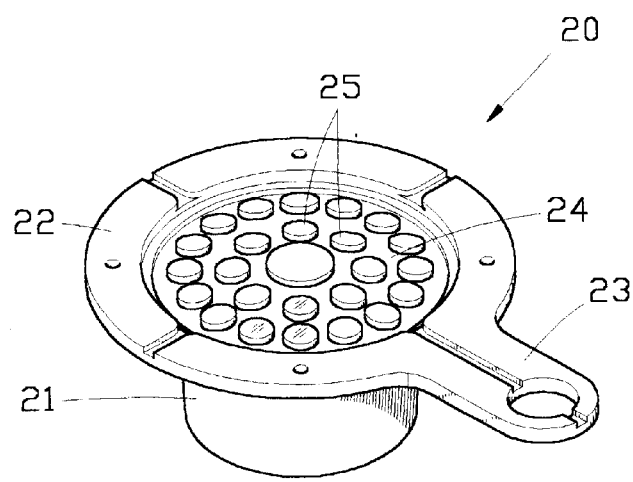
FIG. 2 is a perspective view of the invention of cursor controller, showing the cursor controller installed in a reversed position.
Figure 3:
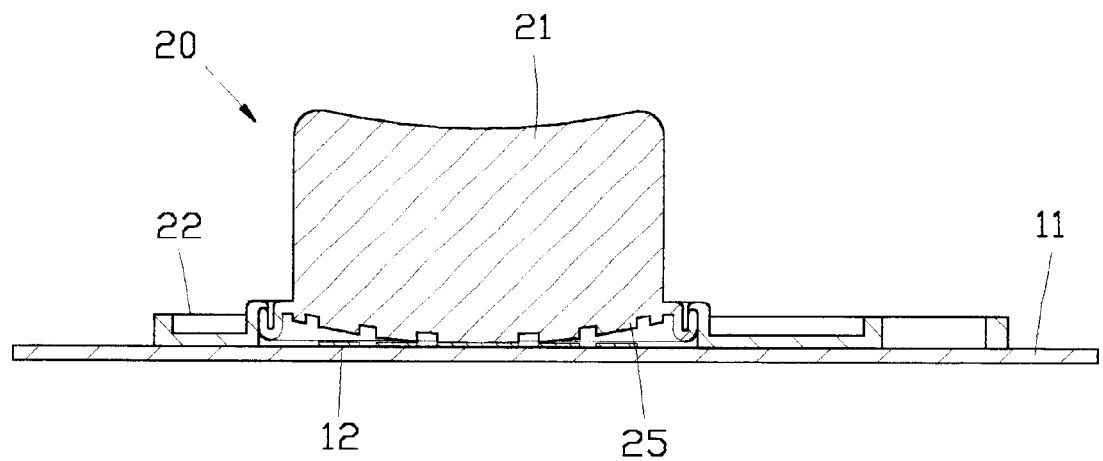
FIG. 3 is a section view of the invention of cursor controller and bottom circuit board.

As shown in FIGS. 2 and 3, the cursor controller 20 is shaped somewhat like a post, comprising a solid post body 21, a flange 22 around the rim of the bottom of the post body 21, and an extended section 23 from the flange 22. The extended section 23 serves to fix the cursor controller 20 inside the casing of the computer keyboard 10, so that the post body 21 can extend from the casing surface of the keyboard 10, as shown in FIG. 1.

The cursor controller 20 is formed at the bottom of the post body 21, forming an arched bottom 24, maintaining a clearance between the arched bottom 24 and the flange 22. On the arched bottom 24 are several protruded-post contact points 25, each protruded-post contact point 25 respectively matching the electrical contact point 12 located at corresponding positions on the surface of the circuit board 11 inside the casing of the keyboard 10, as shown in FIG. 3. When this cursor controller 20 is installed inside the keyboard 10, it is brought into contact with the circuit board 11 from the flange 22 of the post body 21, the clearance between the arched bottom 24 and the flange 22 providing a space for pressing the cursor controller 20.

Figure 4:
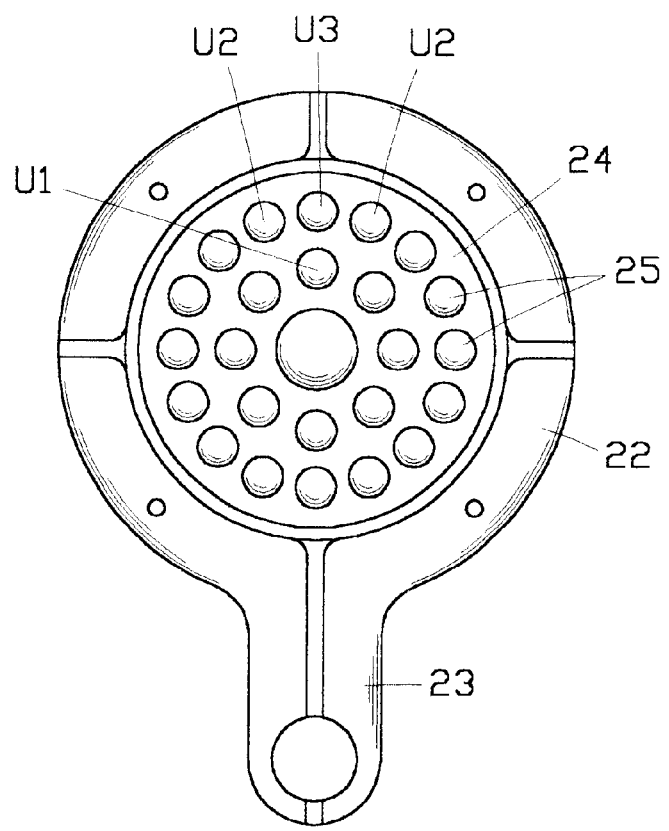
FIG. 4 is a bottom view of the invention of cursor controller, showing the arrangement of each protruded-post contact point on an arched bottom.

As shown in FIG. 4 that shows a preferred embodiment of the invention, each protruded-post contact point 25 is arranged symmetrically in two concentric circles on the arch bottom 24 of the cursor controller 20, four protruded-post contact points forming one set, comprising eight directions for the movement of the cursor controller, i.e., up, upper right, right, lower right, down, lower left, left and upper left. By way of the height difference of each protruded-post contact point 25 of respective movement direction set, the operator can control the direction and strength of pressure on the cursor controller 20, conducting electric charge to the electrical contact point 12, in different directions and different quantities, on the circuit board 11, to change the direction and speed change of the cursor.

Take the example of "UP" direction of movement composed by four protruded-post contact points 25, U1, U2, U3, as shown in FIG. 4.

1. When the operator presses forward the upper end of the cursor controller 20, due to the arched bottom 24 of the cursor controller, the protruded-post contact point U1 first touches the electrical contact point 12 at a corresponding position on the circuit board 11, to control the cursor on the monitor to move upward;

2. When the operator increases the pressure applied forward on the upper end of the cursor controller, the protruded-post contact point U2 on the arched bottom 24 touches the corresponding electrical contact point on the circuit board 11, to control the up-moving cursor and increase its moving speed;
3. When the operator further increases the pressure applied forward on the upper end of the cursor controller 20, the protruded-post contact point U3 on the arched bottom 24 touches the corresponding electrical contact point, to control the up-moving cursor to move rapidly;
4. By manual control on the cursor controller 20, the user can smoothly control the cursor to move faster when the force applied is increased.

In this way, the cursor speed of the other seven direction sets can also be controlled easily to perform the above purpose.

The cursor movement speed can be programmed in advance in the system. For example, the cursor movement speed is set at 1 mm/sec for conductance of protruded-post contact point U1 with the electrical contact point, the cursor movement speed set at 2.5 mm/sec for conductance of protruded-post contact point U2 with the electrical contact point, or the cursor movement speed set at 5 mm/sec for conductance of protruded-post contact point U3 with the electrical contact point.

The aforementioned invention of cursor controller 20 is preferably made of flexible materials, such as rubber.

The above-preferred embodiment serves to explain the applicability of the invention. In actual production, this integral measurement of the invention of cursor controller 20 can be changed to suit different circumstances, to enable installation at different appliances, such as a mouse or a notebook computer.

What is claimed is:

1. A cursor controller, installed at an appropriate location on a computer keyboard, for controlling the direction of movement and speed variation of the cursor, comprising:

a solid post body, at the rim of the bottom of the post body being a flange, said flange having an extended section, serving to fix the cursor controller inside the casing of a computer keyboard, enabling the post body to extend from the surface of the casing of the keyboard, the bottom of the post body forming an arched bottom, maintaining a clearance between said arched bottom and said flange;

a plurality of protruded-post contact point, installed on the arched bottom of the post body, respectively corresponding to the electrical contact points at matching positions on the surface of the circuit board inside the casing of the keyboard, said protruded-post contact points on the arched bottom, symmetrically arranged in two concentric circles, four protruded-post contact points forming a set, comprising eight cursor movement direction sets, i.e., up, upper right, right, lower right, down, lower left, left, and upper left; by way of the height difference of each protruded-post contact point of each movement direction set, the operator can apply pressure, in different directions and forces, on this cursor controller, conducting the electrical contact points in different directions and different quantities on the circuit board, to change the direction and speed of the cursor.

2. The cursor controller as claimed in claim 1, wherein the cursor controller is installed on a mouse.

3. The cursor controller as claimed in claim 1, wherein the cursor controller is installed on a notebook.

* * * * *

UNITED STATES PATENT AND TRADEMARK OFFICE
CERTIFICATE OF CORRECTION

| | | |
|---|---|---|
| PATENT NO. | : 6,624,805 B2 | |
| APPLICATION NO. | : 09/899146 | |
| DATED | : September 23, 2003 | |
| INVENTOR(S) | : Liu et al. | |

It is certified that error appears in the above-identified patent and that said Letters Patent is hereby corrected as shown below:

On the title page item [75] inventors, replace "Chin-Wen Su" with "Chih-Wen Su"

Signed and Sealed this
Third Day of January, 2012

David J. Kappos
*Director of the United States Patent and Trademark Office*